United States Patent
El-Ghoroury et al.

(10) Patent No.: US 11,609,427 B2
(45) Date of Patent: Mar. 21, 2023

(54) DUAL-MODE AUGMENTED/VIRTUAL REALITY (AR/VR) NEAR-EYE WEARABLE DISPLAYS

(71) Applicant: Ostendo Technologies, Inc., Carlsbad, CA (US)

(72) Inventors: Hussein S. El-Ghoroury, Carlsbad, CA (US); Chih-Li Chuang, San Diego, CA (US); Biagio Agostinelli, Escondido, CA (US)

(73) Assignee: Ostendo Technologies, Inc., Carlsbad, CA (US)

( * ) Notice: Subject to any disclaimer, the term of this patent is extended or adjusted under 35 U.S.C. 154(b) by 0 days.

(21) Appl. No.: 15/294,447

(22) Filed: Oct. 14, 2016

(65) Prior Publication Data
US 2017/0108697 A1   Apr. 20, 2017

Related U.S. Application Data

(60) Provisional application No. 62/242,963, filed on Oct. 16, 2015.

(51) Int. Cl.
*G02B 27/01* (2006.01)
*G06F 3/01* (2006.01)
(Continued)

(52) U.S. Cl.
CPC ........... *G02B 27/0172* (2013.01); *G02B 6/10* (2013.01); *G02B 27/0081* (2013.01);
(Continued)

(58) Field of Classification Search
CPC ............ G02B 27/0172; G02B 27/0093; G02B 5/1842; G02B 6/10; G06F 3/013; G06F 3/012; G06F 3/03547; G09G 5/026
See application file for complete search history.

(56) References Cited

U.S. PATENT DOCUMENTS

| 4,427,912 A | 1/1984 | Bui et al. |
| 5,162,828 A | 11/1992 | Furness et al. |

(Continued)

FOREIGN PATENT DOCUMENTS

| CN | 102591016 A | 7/2012 |
| CN | 103298410   | 9/2013 |

(Continued)

OTHER PUBLICATIONS

Ahumada, Jr., Albert J. et al., "Spatio-temporal discrimination model predicts temporal masking functions", Proceedings of SPIE—the International Society for Optical Engineering, Human vision and electronic imaging III, vol. 3299, 1998, 6 pp. total.

(Continued)

*Primary Examiner* — Nelson M Rosario
*Assistant Examiner* — Scott D Au
(74) *Attorney, Agent, or Firm* — Greg Calwell, Esq.; W. Eric Boyd, Esq.

(57) ABSTRACT

A dual-mode augmented/virtual reality near-eye wearable display for use with a curved lens element. The lenses are provided with one or more transparent waveguide elements that are disposed within the thickness of the lenses. The waveguide elements are configured to couple display images directly from image sources such as emissive display imagers to an exit aperture or plurality of exit aperture sub-regions within a viewer's field of view. In a preferred embodiment, a plurality of image sources are disposed on the peripheral surface of the lenses whereby each image source has a dedicated input image aperture and exit aperture sub-region that are each "piecewise flat" and have matched areas and angles of divergence whereby a viewer is presented with the output of the plurality of image source images within the viewer's field of view.

24 Claims, 6 Drawing Sheets

(51) Int. Cl.
*G09G 3/00* (2006.01)
*G02B 27/00* (2006.01)
*G02B 6/10* (2006.01)
*G06F 3/0354* (2013.01)
*G06T 11/60* (2006.01)
*G09G 5/02* (2006.01)
*G09G 5/10* (2006.01)
*G02B 5/18* (2006.01)

(52) U.S. Cl.
CPC ....... *G02B 27/0093* (2013.01); *G02B 27/017* (2013.01); *G06F 3/011* (2013.01); *G06F 3/012* (2013.01); *G06F 3/013* (2013.01); *G06F 3/03547* (2013.01); *G06T 11/60* (2013.01); *G09G 3/003* (2013.01); *G09G 5/026* (2013.01); *G09G 5/10* (2013.01); *G02B 5/1842* (2013.01); *G02B 2027/0147* (2013.01); *G02B 2027/0178* (2013.01); *G02B 2027/0187* (2013.01); *G06F 2203/0339* (2013.01); *G09G 2320/0626* (2013.01); *G09G 2320/0666* (2013.01); *G09G 2340/12* (2013.01); *G09G 2354/00* (2013.01); *G09G 2360/144* (2013.01)

(56) References Cited

U.S. PATENT DOCUMENTS

| | | | |
|---|---|---|---|
| 5,368,042 A | 11/1994 | O'Neal et al. |
| 5,619,373 A | 4/1997 | Meyerhofer et al. |
| 5,696,521 A | 12/1997 | Robinson et al. |
| 5,818,359 A | 10/1998 | Beach |
| 5,886,822 A | 3/1999 | Spitzer |
| 5,986,811 A | 11/1999 | Wohlstadter |
| 6,128,003 A | 10/2000 | Smith et al. |
| 6,147,807 A | 11/2000 | Droessler et al. |
| 6,151,167 A | 11/2000 | Melville |
| 6,353,503 B1 | 3/2002 | Spitzer et al. |
| 6,433,907 B1 | 8/2002 | Lippert et al. |
| 6,456,438 B1 | 9/2002 | Lee et al. |
| 6,522,794 B1 | 2/2003 | Bischel et al. |
| 6,529,331 B2 | 3/2003 | Massof et al. |
| 6,666,825 B2 | 12/2003 | Smith et al. |
| 6,710,902 B2 | 3/2004 | Takeyama |
| 6,719,693 B2 | 4/2004 | Richard |
| 6,795,221 B1 | 9/2004 | Urey |
| 6,803,561 B2 | 10/2004 | Dunfield |
| 6,804,066 B1 | 10/2004 | Ha et al. |
| 6,829,095 B2 | 12/2004 | Amitai |
| 6,924,476 B2 | 8/2005 | Wine et al. |
| 6,937,221 B2 | 8/2005 | Lippert et al. |
| 6,984,208 B2 | 1/2006 | Zheng |
| 6,999,238 B2 | 2/2006 | Glebov et al. |
| 7,061,450 B2 | 6/2006 | Bright et al. |
| 7,071,594 B1 | 7/2006 | Yan et al. |
| 7,106,519 B2 | 9/2006 | Aizenberg et al. |
| 7,190,329 B2 | 3/2007 | Lewis et al. |
| 7,193,758 B2 | 3/2007 | Wiklof et al. |
| 7,209,271 B2 | 4/2007 | Lewis et al. |
| 7,215,475 B2 | 5/2007 | Woodgate et al. |
| 7,232,071 B2 | 6/2007 | Lewis et al. |
| 7,369,321 B1 | 5/2008 | Ren et al. |
| 7,482,730 B2 | 1/2009 | Davis et al. |
| 7,486,255 B2 | 2/2009 | Brown et al. |
| 7,545,571 B2 | 6/2009 | Garoutte et al. |
| 7,580,007 B2 | 8/2009 | Brown et al. |
| 7,619,807 B2 | 11/2009 | Baek et al. |
| 7,623,560 B2 | 11/2009 | El-Ghoroury et al. |
| 7,724,210 B2 | 5/2010 | Sprague et al. |
| 7,747,301 B2 | 6/2010 | Cheng et al. |
| 7,767,479 B2 | 8/2010 | El-Ghoroury et al. |
| 7,791,810 B2 | 9/2010 | Powell |
| 7,829,902 B2 | 11/2010 | El-Ghoroury et al. |
| 7,952,809 B2 | 5/2011 | Takai |
| 8,049,231 B2 | 11/2011 | El-Ghoroury et al. |
| 8,098,265 B2 | 1/2012 | El-Ghoroury et al. |
| 8,243,770 B2 | 8/2012 | El-Ghoroury et al. |
| 8,279,716 B1 | 10/2012 | Gossweiler, III et al. |
| 8,292,833 B2 | 10/2012 | Son et al. |
| 8,405,618 B2 | 3/2013 | Colgate et al. |
| 8,471,967 B2 | 6/2013 | Miao et al. |
| 8,477,425 B2 | 7/2013 | Border et al. |
| 8,482,859 B2 | 7/2013 | Border |
| 8,508,830 B1 | 8/2013 | Wang |
| 8,508,851 B2 | 8/2013 | Miao et al. |
| 8,510,244 B2 | 8/2013 | Carson et al. |
| 8,553,910 B1 | 10/2013 | Dong et al. |
| 8,567,960 B2 | 10/2013 | El-Ghoroury et al. |
| 8,619,049 B2 | 12/2013 | Harrison et al. |
| 8,725,842 B1 | 5/2014 | Al-Nasser |
| 8,743,145 B1 | 6/2014 | Price |
| 8,773,599 B2 | 7/2014 | Saeedi et al. |
| 8,854,724 B2 | 10/2014 | El-Ghoroury et al. |
| 8,928,969 B2 | 1/2015 | Alpaslan et al. |
| 8,975,713 B2 | 3/2015 | Sako et al. |
| 9,097,890 B2 | 8/2015 | Miller et al. |
| 9,110,504 B2 | 8/2015 | Lewis et al. |
| 9,134,535 B2 | 9/2015 | Dobschal et al. |
| 9,179,126 B2 | 11/2015 | El-Ghoroury et al. |
| 9,195,053 B2 | 11/2015 | El-Ghoroury et al. |
| 9,239,453 B2 | 1/2016 | Cheng et al. |
| 9,244,277 B2 | 1/2016 | Cheng et al. |
| 9,244,539 B2 | 1/2016 | Venable et al. |
| 9,274,608 B2 | 3/2016 | Katz et al. |
| 9,286,730 B2 | 3/2016 | Bar-Zeev et al. |
| 9,529,191 B2 | 12/2016 | Sverdrup et al. |
| 9,538,182 B2 | 1/2017 | Mishourovsky et al. |
| 9,681,069 B2 | 6/2017 | El-Ghoroury et al. |
| 9,712,764 B2 | 7/2017 | El-Ghoroury et al. |
| 9,774,800 B2 | 9/2017 | El-Ghoroury et al. |
| 9,779,515 B2 | 10/2017 | El-Ghoroury et al. |
| 9,965,982 B2 | 5/2018 | Lapstun |
| 2002/0008854 A1 | 1/2002 | Leigh Travis |
| 2002/0017567 A1 | 2/2002 | Connolly et al. |
| 2002/0024495 A1 | 2/2002 | Lippert et al. |
| 2002/0075232 A1 | 6/2002 | Daum et al. |
| 2002/0083164 A1 | 6/2002 | Katayama et al. |
| 2002/0141026 A1 | 10/2002 | Wiklof et al. |
| 2002/0158814 A1 | 10/2002 | Bright et al. |
| 2002/0181115 A1 | 12/2002 | Massof et al. |
| 2002/0194005 A1 | 12/2002 | Lahr |
| 2003/0032884 A1 | 2/2003 | Smith et al. |
| 2003/0086135 A1 | 5/2003 | Takeyama |
| 2003/0122066 A1 | 7/2003 | Dunfield |
| 2003/0138130 A1 | 7/2003 | Cohen et al. |
| 2003/0184575 A1 | 10/2003 | Reho et al. |
| 2003/0187357 A1 | 10/2003 | Richard |
| 2004/0004585 A1 | 1/2004 | Brown et al. |
| 2004/0024312 A1 | 2/2004 | Zheng |
| 2004/0051392 A1 | 3/2004 | Badarneh |
| 2004/0080807 A1 | 4/2004 | Chen et al. |
| 2004/0080938 A1 | 4/2004 | Holman et al. |
| 2004/0085261 A1 | 5/2004 | Lewis et al. |
| 2004/0119004 A1 | 6/2004 | Wine et al. |
| 2004/0125076 A1 | 7/2004 | Green |
| 2004/0138935 A1 | 7/2004 | Johnson et al. |
| 2004/0179254 A1 | 9/2004 | Lewis et al. |
| 2004/0240064 A1 | 12/2004 | Dutta |
| 2005/0002074 A1 | 1/2005 | McPheters et al. |
| 2005/0024730 A1 | 2/2005 | Aizenberg et al. |
| 2005/0053192 A1 | 3/2005 | Sukovic et al. |
| 2005/0116038 A1 | 6/2005 | Lewis et al. |
| 2005/0117195 A1 | 6/2005 | Glebov et al. |
| 2005/0168700 A1 | 8/2005 | Berg et al. |
| 2005/0179976 A1 | 8/2005 | Davis et al. |
| 2005/0264502 A1 | 12/2005 | Sprague et al. |
| 2006/0017655 A1 | 1/2006 | Brown et al. |
| 2006/0132383 A1 | 6/2006 | Gally et al. |
| 2006/0152812 A1 | 7/2006 | Woodgate et al. |
| 2006/0253007 A1 | 11/2006 | Cheng et al. |
| 2006/0285192 A1 | 12/2006 | Yang |
| 2006/0290663 A1 | 12/2006 | Mitchell |
| 2007/0052694 A1 | 3/2007 | Holmes |
| 2007/0083120 A1 | 4/2007 | Cain et al. |

(56) References Cited

U.S. PATENT DOCUMENTS

| | | |
|---|---|---|
| 2007/0236450 A1 | 10/2007 | Colgate et al. |
| 2007/0269432 A1 | 11/2007 | Nakamura et al. |
| 2007/0276658 A1 | 11/2007 | Douglass |
| 2008/0002262 A1 | 1/2008 | Chirieleison |
| 2008/0049291 A1 | 2/2008 | Baek et al. |
| 2008/0130069 A1 | 6/2008 | Cernasov |
| 2008/0141316 A1 | 6/2008 | Igoe et al. |
| 2008/0239452 A1 | 10/2008 | Xu et al. |
| 2009/0073559 A1 | 3/2009 | Woodgate et al. |
| 2009/0086170 A1 | 4/2009 | El-Ghoroury et al. |
| 2009/0096746 A1 | 4/2009 | Kruse et al. |
| 2009/0161191 A1 | 6/2009 | Powell |
| 2009/0199900 A1 | 8/2009 | Bita et al. |
| 2009/0222113 A1 | 9/2009 | Fuller et al. |
| 2009/0256287 A1 | 10/2009 | Fu et al. |
| 2009/0268303 A1 | 10/2009 | Takai |
| 2009/0278998 A1 | 11/2009 | El-Ghoroury et al. |
| 2009/0327171 A1 | 12/2009 | Tan et al. |
| 2010/0003777 A1 | 1/2010 | El-Ghoroury et al. |
| 2010/0026960 A1 | 2/2010 | Sprague |
| 2010/0046070 A1 | 2/2010 | Mukawa |
| 2010/0053164 A1 | 3/2010 | Imai et al. |
| 2010/0066921 A1 | 3/2010 | El-Ghoroury et al. |
| 2010/0091050 A1 | 4/2010 | El-Ghoroury et al. |
| 2010/0156676 A1 | 6/2010 | Mooring et al. |
| 2010/0171922 A1 | 7/2010 | Sessner et al. |
| 2010/0199232 A1 | 8/2010 | Mistry et al. |
| 2010/0220042 A1 | 9/2010 | El-Ghoroury et al. |
| 2010/0241601 A1 | 9/2010 | Carson et al. |
| 2010/0245957 A1 | 9/2010 | Hudman et al. |
| 2010/0259472 A1 | 10/2010 | Radivojevic et al. |
| 2010/0267449 A1 | 10/2010 | Gagner et al. |
| 2011/0054360 A1 | 3/2011 | Son et al. |
| 2011/0115887 A1 | 5/2011 | Yoo et al. |
| 2011/0221659 A1 | 9/2011 | King, III et al. |
| 2011/0285666 A1 | 11/2011 | Poupyrev et al. |
| 2011/0285667 A1 | 11/2011 | Poupyrev et al. |
| 2012/0033113 A1 | 2/2012 | El-Ghoroury et al. |
| 2012/0075173 A1 | 3/2012 | Ashbrook et al. |
| 2012/0075196 A1 | 3/2012 | Ashbrook et al. |
| 2012/0105310 A1 | 5/2012 | Sverdrup et al. |
| 2012/0113097 A1 | 5/2012 | Nam et al. |
| 2012/0120498 A1 | 5/2012 | Harrison et al. |
| 2012/0143358 A1 | 6/2012 | Adams et al. |
| 2012/0154277 A1* | 6/2012 | Bar-Zeev ............ G02B 27/017 345/158 |
| 2012/0154441 A1 | 6/2012 | Kim |
| 2012/0157203 A1 | 6/2012 | Latta et al. |
| 2012/0195461 A1 | 8/2012 | Lawrence Ashok Inigo |
| 2012/0212398 A1 | 8/2012 | Border et al. |
| 2012/0212399 A1 | 8/2012 | Border et al. |
| 2012/0218301 A1 | 8/2012 | Miller |
| 2012/0236201 A1 | 9/2012 | Larsen et al. |
| 2012/0249409 A1 | 10/2012 | Toney et al. |
| 2012/0249741 A1 | 10/2012 | Maciocci et al. |
| 2012/0288995 A1 | 11/2012 | El-Ghoroury et al. |
| 2012/0290943 A1 | 11/2012 | Toney et al. |
| 2012/0293402 A1 | 11/2012 | Harrison et al. |
| 2012/0299962 A1 | 11/2012 | White et al. |
| 2012/0319940 A1 | 12/2012 | Bress et al. |
| 2012/0320092 A1 | 12/2012 | Shin et al. |
| 2013/0016292 A1 | 1/2013 | Miao et al. |
| 2013/0021658 A1 | 1/2013 | Miao et al. |
| 2013/0027341 A1 | 1/2013 | Mastandrea |
| 2013/0041477 A1 | 2/2013 | Sikdar et al. |
| 2013/0050260 A1 | 2/2013 | Reitan |
| 2013/0077049 A1* | 3/2013 | Bohn ..................... G02B 5/20 351/210 |
| 2013/0080890 A1 | 3/2013 | Krishnamurthi |
| 2013/0083303 A1 | 4/2013 | Hoover et al. |
| 2013/0100362 A1 | 4/2013 | Saeedi et al. |
| 2013/0141895 A1 | 6/2013 | Alpaslan et al. |
| 2013/0162505 A1 | 6/2013 | Crocco et al. |
| 2013/0169536 A1 | 7/2013 | Wexler et al. |
| 2013/0176622 A1 | 7/2013 | Abrahamsson et al. |
| 2013/0187836 A1 | 7/2013 | Cheng et al. |
| 2013/0196757 A1 | 8/2013 | Latta et al. |
| 2013/0215516 A1 | 8/2013 | Dobschal et al. |
| 2013/0225999 A1 | 8/2013 | Banjanin et al. |
| 2013/0258451 A1 | 10/2013 | El-Ghoroury et al. |
| 2013/0271679 A1 | 10/2013 | Sakamoto et al. |
| 2013/0285174 A1 | 10/2013 | Sako et al. |
| 2013/0286053 A1 | 10/2013 | Fleck et al. |
| 2013/0286178 A1 | 10/2013 | Lewis et al. |
| 2013/0321581 A1 | 12/2013 | El-Ghoroury et al. |
| 2013/0335404 A1 | 12/2013 | Westerinen et al. |
| 2014/0009845 A1 | 1/2014 | Cheng et al. |
| 2014/0024132 A1 | 1/2014 | Jia et al. |
| 2014/0049417 A1 | 2/2014 | Abdurrahman et al. |
| 2014/0049983 A1 | 2/2014 | Nichol et al. |
| 2014/0055352 A1 | 2/2014 | David et al. |
| 2014/0055692 A1 | 2/2014 | Kroll et al. |
| 2014/0085177 A1 | 3/2014 | Lyons et al. |
| 2014/0091984 A1 | 4/2014 | Ashbrook et al. |
| 2014/0098018 A1 | 4/2014 | Kim et al. |
| 2014/0098067 A1 | 4/2014 | Yang et al. |
| 2014/0118252 A1 | 5/2014 | Kim et al. |
| 2014/0129207 A1 | 5/2014 | Bailey et al. |
| 2014/0139454 A1 | 5/2014 | Mistry et al. |
| 2014/0139576 A1 | 5/2014 | Costa et al. |
| 2014/0147035 A1 | 5/2014 | Ding et al. |
| 2014/0168062 A1 | 6/2014 | Katz et al. |
| 2014/0176417 A1 | 6/2014 | Young et al. |
| 2014/0185142 A1 | 7/2014 | Gupta et al. |
| 2014/0200496 A1 | 7/2014 | Hyde et al. |
| 2014/0232651 A1 | 8/2014 | Kress et al. |
| 2014/0292620 A1 | 10/2014 | Lapstun |
| 2014/0300869 A1 | 10/2014 | Hirsch et al. |
| 2014/0301662 A1 | 10/2014 | Justice et al. |
| 2014/0304646 A1 | 10/2014 | Rossmann |
| 2014/0333734 A1 | 11/2014 | Yang et al. |
| 2014/0340304 A1 | 11/2014 | Dewan et al. |
| 2015/0001987 A1 | 1/2015 | Masaki et al. |
| 2015/0035832 A1 | 2/2015 | Sugden et al. |
| 2015/0054729 A1 | 2/2015 | Minnen et al. |
| 2015/0058102 A1 | 2/2015 | Christensen et al. |
| 2015/0125109 A1 | 5/2015 | Robbins et al. |
| 2015/0138086 A1 | 5/2015 | Underkoffler et al. |
| 2015/0148886 A1 | 5/2015 | Rao et al. |
| 2015/0193984 A1 | 7/2015 | Bar-Zeev et al. |
| 2015/0205126 A1 | 7/2015 | Schowengerdt |
| 2015/0220109 A1 | 8/2015 | von Badinski et al. |
| 2015/0235467 A1 | 8/2015 | Schowengerdt et al. |
| 2015/0241707 A1 | 8/2015 | Schowengerdt |
| 2015/0277126 A1 | 10/2015 | Hirano et al. |
| 2015/0301256 A1 | 10/2015 | Takiguchi |
| 2015/0301383 A1 | 10/2015 | Kimura |
| 2015/0033539 A1 | 11/2015 | El-Ghoroury et al. |
| 2015/0323990 A1 | 11/2015 | Maltz |
| 2015/0323998 A1 | 11/2015 | Kudekar et al. |
| 2015/0326842 A1 | 11/2015 | Huai |
| 2015/0348321 A1* | 12/2015 | Rossini .................. G06F 3/013 345/633 |
| 2015/0381782 A1 | 12/2015 | Park |
| 2016/0018948 A1 | 1/2016 | Parvarandeh et al. |
| 2016/0026059 A1 | 1/2016 | Chung et al. |
| 2016/0028935 A1 | 1/2016 | El-Ghoroury et al. |
| 2016/0116738 A1 | 4/2016 | Osterhout |
| 2016/0182782 A1 | 6/2016 | El-Ghoroury et al. |
| 2016/0191765 A1 | 6/2016 | El-Ghoroury et al. |
| 2016/0191823 A1 | 6/2016 | El-Ghoroury et al. |
| 2016/0220232 A1 | 8/2016 | Takada et al. |
| 2016/0342151 A1 | 11/2016 | Dey, IV et al. |
| 2017/0065872 A1 | 3/2017 | Kelley |
| 2017/0069134 A1 | 3/2017 | Shapira et al. |
| 2017/0116897 A1* | 4/2017 | Ahn ...................... G02B 27/02 |
| 2017/0184776 A1 | 6/2017 | El-Ghoroury et al. |
| 2017/0236295 A1 | 8/2017 | El-Ghoroury et al. |
| 2017/0261388 A1 | 9/2017 | Ma et al. |
| 2017/0310956 A1 | 10/2017 | Perdices-Gonzalez et al. |

(56) References Cited

U.S. PATENT DOCUMENTS

FOREIGN PATENT DOCUMENTS

| CN | 103424803 | A | 12/2013 |
|---|---|---|---|
| CN | 103546181 | | 1/2014 |
| CN | 103558918 | | 2/2014 |
| CN | 104460992 | | 3/2015 |
| CN | 108369339 | A | 8/2018 |
| EP | 0431488 | | 1/1996 |
| EP | 3362838 | A1 | 8/2018 |
| IN | 201847017649 | A | 5/2018 |
| JP | H099301 | A | 1/1997 |
| JP | H09185009 | A | 7/1997 |
| JP | 2001264683 | A | 9/2001 |
| JP | 2014511512 | A | 5/2014 |
| JP | 2014142386 | A | 8/2014 |
| JP | 2018533765 | A | 11/2018 |
| KR | 20180070626 | A | 6/2018 |
| TW | 201728961 | A | 8/2017 |
| WO | WO-2012/082807 | | 6/2012 |
| WO | 2012082807 | A3 | 9/2012 |
| WO | WO-2014/124173 | | 8/2014 |
| WO | 2017066802 | A1 | 4/2017 |

OTHER PUBLICATIONS

Beulen, Bart W. et al., "Toward Noninvasive Blood Pressure Assessment in Arteries by Using Ultrasound", Ultrasound in Medicine & Biology, vol. 37, No. 5, 2011, pp. 788-797.
Bickel, Bernd et al., "Capture and Modeling of Non-Linear Heterogeneous Soft Tissue", ACM Transactions on Graphics (TOG)—Proceedings of ACM SIGGRAPH 2009, vol. 28, Issue 3, Article No. 89, Aug. 2009, 9 pp. total.
Castellini, Claudio et al., "Using Ultrasound Images of the Forearm to Predict Finger Positions", IEEE Transactions on Neural Systems and Rehabilitation Engineering, vol. 20, No. 6, Nov. 2012, pp. 788-797.
Cobbold, Richard S. , "Foundations of Biomedical Ultrasound", Oxford University Press, 2007, pp. 3-95.
Guo, Jing-Yi et al., "Dynamic monitoring of forearm muscles using one-dimensional sonomyography system", Journal of Rehabilitation Research & Development, vol. 45, No. 1, 2008, pp. 187-195.
Harrison, Chris et al., "Skinput: Appropriating the Body as an Input Surface", CHI '10 Proceedings of the SIGCHI Conference on Human Factors in Computing Systems, 2010, pp. 453-462.
Hsiao, Tzu-Yu et al., "Noninvasive Assessment of Laryngeal Phonation Function Using Color Doppler Ultrasound Imaging", Ultrasound in Med. & Biol., vol. 27, No. 8, 2001, pp. 1035-1040.
Keir, Peter J. et al., "Changes in geometry of the finger flexor tendons in the carpal tunnel with wrist posture and tendon load: an MRI study on normal wrists", Clinical Biomechanics, vol. 14, 1999, pp. 635-645.
Khuri-Yakub, Butrus T. et al., "Capacitive micromachined ultrasonic transducers for medical imaging and therapy", J. Micromech. Microeng., vol. 21, No. 5, May 2011, pp. 054004-054014.
Koutsouridis, G. G. et al., "Towards a Non-Invasive Ultrasound Pressure Assessment in Large Arteries", Technische Universiteit Eindhoven, University of Technology, Mate Poster Award 2010 : 15th Annual Poster Contest, 2010, 1 page total.
Legros, M. et al., "Piezocomposite and CMUT Arrays Assessment Through In Vitro Imaging Performances", 2008 IEEE Ultrasonics Symposium, Nov. 2-5, 2008, pp. 1142-1145.
Martin, Joel R. et al., "Changes in the flexor digitorum profundus tendon geometry in the carpal tunnel due to force production and posture of metacarpophalangeal joint of the index finger: An MRI study", Clinical Biomechanics, vol. 28, 2013, pp. 157-163.
Martin, Joel R. et al., "Effects of the index finger position and force production on the flexor digitorum superficialis moment arms at the metacarpophalangeal joints—a magnetic resonance imaging study", Clinical Biomechanics, vol. 27, 2012, pp. 453-459.
Mujibiya, Adiyan et al., "The Sound of Touch: On-body Touch and Gesture Sensing Based on Transdermal Ultrasound Propagation", ITS '13 Proceedings of the 2013 ACM international conference on Interactive tabletops and surfaces, Oct. 6-9, 2013, pp. 189-198.
Paclet, Florent et al., "Motor control theories improve biomechanical model of the hand for finger pressing tasks", Journal of Biomechanics, vol. 45, 2012, pp. 1246-1251.
Pinton, Gianmarco F. et al., "A Heterogeneous Nonlinear Attenuating Full-Wave Model of Ultrasound", IEEE Transactions on Ultrasonics, Ferroelectrics, and Frequency Control, vol. 56, No. 3, Mar. 2009, pp. 474-488.
Richard, William D. et al., "A scalable architecture for real-time synthetic-focus imaging", Ultrasonic Imaging, vol. 25, 2003, pp. 151-161.
Shi, Jun et al., "Feasibility of controlling prosthetic hand using sonomyography signal in real time: Preliminary study", Journal of Rehabilitation Research & Development, vol. 47, No. 2, 2010, pp. 87-97.
Sikdar, Siddhartha et al., "Novel Method for Predicting Dexterous Individual Finger Movements by Imaging Muscle Activity Using a Wearable Ultrasonic System", IEEE Transactions on Neural Systems and Rehabilitation Engineering, vol. 22, No. 1, Jan. 2014, pp. 69-76.
Sueda, Shinjiro et al., "Musculotendon Simulation for Hand Animation", ACM Transactions on Graphics (TOG)—Proceedings of ACM SIGGRAPH 2008, vol. 27 Issue 3, Article No. 83, vol. 27 Issue 3, Aug. 2008, 8 pp. total.
Szabo, Thomas L. , "Diagnostic Ultrasound Imaging: Inside Out, Second Edition", Elsevier Inc., 2013, 829 pp. total.
Van Den Branden Lambrecht, Christian J. , "A Working Spatio-Temporal Model of the Human Visual System for Image Restoration and Quality Assessment Applications", ICASSP-96, Conference Proceedings of the 1996 IEEE International Conference on Acoustics, Speech, and Signal Processing, May 1996, 4 pp. total.
Watson, Andrew B. et al., "Model of human visual-motion sensing", Journal of the Optical Society of America A, vol. 2, No. 2, Feb. 1985, pp. 322-342.
Watson, Andrew B. et al., "Model of visual contrast gain control and pattern masking", Journal of the Optical Society of America A, vol. 14, No. 9, Sep. 1997, pp. 2379-2391.
Watson, Andrew B. , "The search for optimal visual stimuli", Vision Research, vol. 38, 1998, pp. 1619-1621.
Watson, Andrew B. , "The Spatial Standard Observer: A Human Visual Model for Display Inspection", Society for Information Display, SID 06 Digest, Jun. 2006, pp. 1312-1315.
Watson, Andrew B. , "Visual detection of spatial contrast patterns: Evaluation of five simple models", Optics Express, vol. 6, No. 1, Jan. 3, 2000, pp. 12-33.
Williams III, T. W. , "Progress on stabilizing and controlling powered upper-limb prostheses", Journal of Rehabilitation Research & Development, Guest Editorial, vol. 48, No. 6, 2011, pp. ix-xix.
Willis, Karl D. et al., "MotionBeam: A Metaphor for Character Interaction with Handheld Projectors", CHI '11 Proceedings of the Sigchi Conference on Human Factors in Computing Systems, May 7-12, 2011, pp. 1031-1040.
Yun, Xiaoping et al., "Design, Implementation, and Experimental Results of a Quaternion-Based Kalman Filter for Human Body Motion Tracking", IEEE Transactions on Robotics, vol. 22, No. 6, Dec. 2006, pp. 1216-1227.
Zhang, Cha et al., "Maximum Likelihood Sound Source Localization and Beamforming for Directional Microphone Arrays in Distributed Meetings", IEEE Transactions on Multimedia, vol. 10, No. 3, Apr. 2008, pp. 538-548.
"International Search Report and Written Opinion of the International Searching Authority dated Jan. 17, 2017; International Application No. PCT/US2016/057418", dated Jan. 17, 2017.
Fattal, David et al., "A multi-directional backlight for a wide-angle, glasses-free three-dimensional display", Nature, vol. 495, Mar. 21, 2013, pp. 348-351.
Grossberg, Stephen et al., "Neural dynamics of saccadic and smooth pursuit eye movement coordination during visual tracking of unpredictably moving targets", Neural Networks, vol. 27, 2012, pp. 1-20.

(56) References Cited

OTHER PUBLICATIONS

Hua, Hong et al., "A 3D integral imaging optical see-through head-mounted display", Optics Express, vol. 22, No. 11, May 28, 2014, pp. 13484-13491.
Lanman, Douglas et al., "Near-Eye Light Field Displays", ACM Transactions on Graphics (TOC), vol. 32, Issue 6, Article 220, Nov. 2013, 27 pp. total.
Marwah, Kshitij et al., "Compressive Light Field Photography using Overcomplete Dictionaries and Optimized Projections", Proc. of SIGGRAPH 2013 (ACM Transactions on Graphics, 32, 4), 2013, 12 pp. total.
Rolland, Jannick P. et al., "Dynamic focusing in head-mounted displays", Part of the IS&T/SPIE Conference on the Engineering Reality of Virtual Reality, SPIE vol. 3639, Jan. 1999, pp. 463-470.
Wikipedia, , "List of refractive indices", https://en.wikipedia.org/wiki/List_of_refractive_indices, Dec. 7, 2003, 5 pp. total.
"Supplemental Partial European Search Report dated Jul. 30, 2019; European Patent Application No. 16856441.7", dated Jul. 30, 2019.
Extended European Search Report for European Patent Application No. 16856441.7, dated Nov. 4, 2019, 14 pages.
First Examination Report for India Patent Application No. 201847017649, dated Apr. 5, 2021, 6 pages.
First Office Action for China Patent Application No. 201680073919.0, dated Aug. 3, 2020, 12 pages.
First Office Action for Japan Application No. 2018-519398, dated Sep. 8, 2020, 5 pages.
Office Action for Taiwan Patent Application No. 105133472, dated Jan. 6, 2020, 8 pages.
Second Office Action for China Patent Application No. 201680073919.0, dated Apr. 16, 2021, 11 pages.
Second Office Action for Japan Application No. 2018-519398, dated May 25, 2021, 12 pages.
Second Office Action for Taiwan Patent Application No. 105133472, dated May 14, 2021.
Third Office Action for China Patent Application No. 201680073919.0, dated Sep. 28, 2021, 5 pages.
Decision of Rejection for Chinese Patent Application No. 201680073919,0, dated Jan. 26, 2022, 9 pages.
Notice of Allowance for Taiwan Patent Application No. 105133472, dated Feb. 18, 2022, 3 pages.
Third Office Action for Japanese Application No. 2018-519398, dated Mar. 22, 2022, 6 pages.

\* cited by examiner

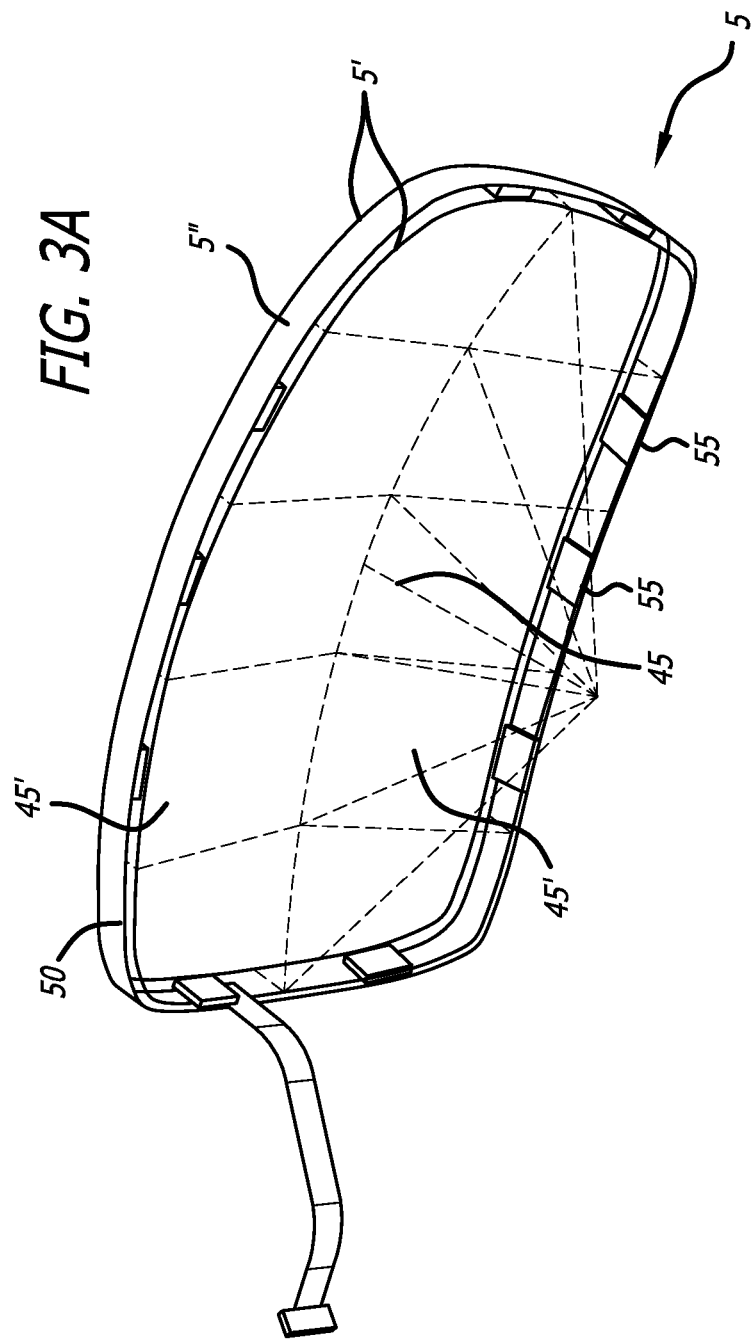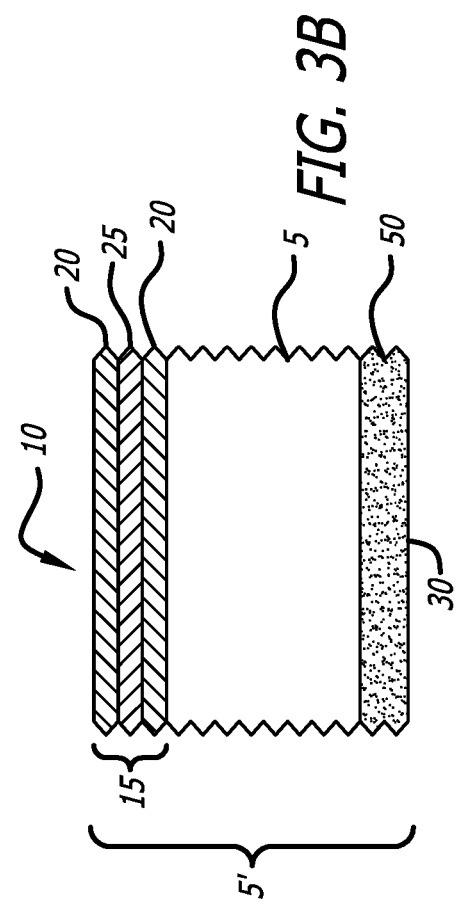

DUAL-MODE AUGMENTED/VIRTUAL REALITY (AR/VR) NEAR-EYE WEARABLE DISPLAYS

CROSS-REFERENCE TO RELATED APPLICATIONS

This application claims the benefit of U.S. Provisional Patent Application No. 62/242,963 filed Oct. 16, 2015, the contents of which are hereby incorporated by reference as if fully stated herein.

BACKGROUND OF THE INVENTION

1. Field of the Invention

The invention relates generally to wearable electronics and more particularly, to a dual-mode augmented/virtual reality near-eye wearable display.

2. Prior Art

Wearable optical electronics are becoming commonplace as integrated circuit size, weight and power (SWaP) and cost scale downward. Wearable optical electronics have a wide number of commercial, military and consumer applications. With respect to wearable optical electronics, there exists prior art, none of which address the need for a high resolution, dual-mode, augmented/virtual reality near-eye wearable display having a form of curved lenses with a non-planar profile and surface, which curved lens profile is used almost exclusively in consumer and other applications and is considered fashionable and aesthetically pleasing. The invention disclosed herein addresses the need for, and enables, such a near-eye wearable display.

BRIEF DESCRIPTION OF THE DRAWINGS

FIG. 3A depicts an optical lens of the invention.

FIG. 3B depicts a cross-section of the lens of FIG. 3A.

DETAILED DESCRIPTION OF THE PREFERRED EMBODIMENTS

Figure 1:
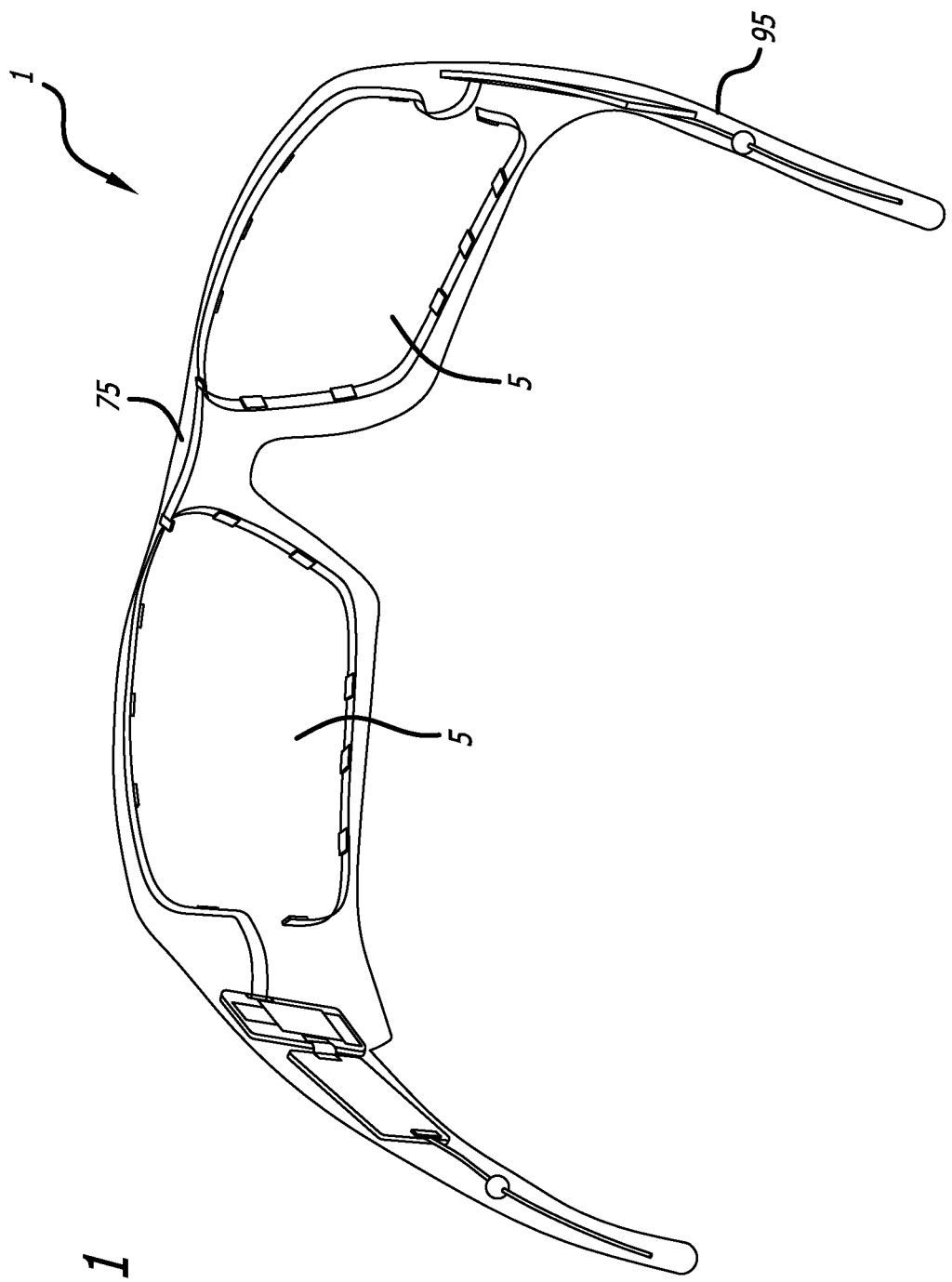
FIG. 1 depicts a perspective view of the dual-mode augmented/virtual reality near-eye wearable display of the invention.

The invention and various of its embodiments are set forth in the following description of the preferred embodiments which are presented as illustrated examples of the invention in the subsequent claims. It is expressly noted that the invention as defined by such claims may be broader than the illustrated embodiments described below.

Turning to the description and the various Figs. wherein like references denote like elements among the several views, disclosed is a dual-mode augmented/virtual reality near-eye wearable display for use with, but not limited to, curved optical lenses.

In a first aspect of the invention, a dual-mode augmented/virtual reality near-eye wearable display is disclosed and may comprise an optical lens comprising a first (scene-facing) surface, a lens thickness, and a lens peripheral edge or surface. The first surface may comprise an electro-tinting layer comprising a variably optically transmissive layer disposed between a first and a second electrically conductive transparent thin film layer. Each of the first and second conductive transparent thin film layers may be coupled to control circuitry configured to vary an optical transmissivity of the variably optically transmissive layer. One or more optical waveguide structures are provided within the lens thickness and may comprise at least one input image aperture and at least one exit aperture, which exit aperture may be divided into a plurality of exit aperture sub-regions. One or more image sources, such as electronic display elements, are optically coupled to their respective input image apertures. The image sources may be disposed on the peripheral (i.e.; edge or side) surface of the lens and configured to directly optically couple a displayed optical image from the image source directly into an input image aperture and then to an exit aperture or from a plurality of input image apertures to a plurality of respective exit aperture sub-regions. The exit aperture's or exit aperture sub-region's optical characteristics are preferably configured to match a predetermined area and predetermined angle of divergence of the respective input image aperture.

The dual-mode augmented/virtual reality near-eye wearable display may be provided wherein the variably optically transmissive layer is comprised of a polymer dispersed liquid crystal (PDLC) material. The dual-mode augmented/virtual reality near-eye wearable display may be provided wherein the plurality of optical waveguide structures disposed within the lens element are each individually "piecewise flat".

The dual-mode augmented/virtual reality near-eye wearable display may be provided wherein the plurality of optical waveguide structures that are piecewise flat provide image portions that are collectively combined in a tiled arrangement to define optical lenses having a curved or non-planar surface and profile. The dual-mode augmented/virtual reality near-eye wearable display may be provided wherein the plurality of optical waveguide structures each are configured to redirect an image that is coupled from its respective input image aperture into its respective exit aperture or exit aperture sub-region. Alternatives to the use of optical waveguide structures that are piecewise flat are also disclosed.

The dual-mode augmented/virtual reality near-eye wearable display may further be provided wherein a plurality of optical waveguide structures collectively define an output eye box of the dual-mode augmented/virtual reality near-eye wearable display. The dual-mode augmented/virtual reality near-eye wearable display may be provided wherein the plurality of optical waveguide structures each have a dedicated input image aperture and exit aperture sub-region that are coupled to a respective dedicated individual image source. The dual-mode augmented/virtual reality near-eye wearable display may be provided wherein the image source comprises an emissive micro-scale pixel array comprising of pixels that are individually spatially, chromatically and temporally addressable.

The dual-mode augmented/virtual reality near-eye wearable display may yet further be provided wherein the plurality of optical waveguide structures each have a dedicated image source coupled into a dedicated input image aperture that is configured to display a portion of a collective image for display to a viewer. The dual-mode augmented/virtual reality near-eye wearable display may be provided wherein the plurality of optical waveguide structures are each optically configured to relay and magnify an image portion coupled from a separate image source into its corresponding exit aperture sub-region of the dual-mode augmented/virtual reality near-eye wearable display.

The dual-mode augmented/virtual reality near-eye wearable display may yet further be provided wherein the waveguide structure is in optical or electronic communication with an image detection sensor that is configured to track a position of a viewer's eye or eyes. The dual-mode augmented/virtual reality near-eye wearable display may be provided wherein at least one thin film layer is comprised of an indium tin oxide material. The dual-mode augmented/virtual reality near-eye wearable display may further comprise processing circuitry configured to sense when a viewer recognizes a displayed image and to supplement or modify the recognized and displayed image with predetermined image data or to modify or supplement some or all of the displayed scene in the viewer's field of view.

The dual-mode augmented/virtual reality near-eye wearable display may yet further be provided wherein the optical waveguide structure includes a micro-imprinted facet structure as a waveguide layer. The optical waveguide layer may comprise a micro-imprinted facet structure. The micro-imprinted facet structure may comprise a surface relief optical element or a volume relief diffractive waveguide. The micro-imprinted facet structure may comprise a diffractive grating waveguide, a blazed grating waveguide, a multi-level grating waveguide or a Bragg grating waveguide.

As depicted, for instance in FIG. 1, the near-eye wearable display 1 of the invention is preferably configured as a conventional-looking eyewear frame and lens assembly having at least one optical lens 5. The lenses 5 may comprise non-planar surfaces or piecewise planar surfaces and be configured to operate in an augmented reality (AR), a virtual reality (VR) or a hybrid AR/VR mode.

Turning to FIGS. 2, 3A-C and 4, lenses 5 are comprised of a lens thickness 5' and a lens peripheral or edge surface 5". As detailed in the lens 5 cross-section of FIG. 3B, in a preferred embodiment, the front side, scene-facing surfaces 10 of lenses 5 of the disclosed dual-mode AR/VR near-eye wearable display 1 may be provided with an electro-tinting layer 15. Electro-tinting layer 15 may comprise multiple thin-film layers 20 designed to electrically control the transmissivity (or tinting level) through lenses 5. Multiple thin-film layers 20 may comprise at least one variably optically transmissive layer 25 of a variably optically transmissive material such as a polymer-dispersed liquid crystal (PDLC) material or equivalent suitable material that is sandwiched between thin-film layers 20. Thin film layers 20 may comprise an electrically conductive, optically transparent material such as indium tin oxide (ITO). Thin film layers 20 are configured to enable the coupling of an electrical signal or potential across variably optically transmissive layer 25 for the purpose of electrically varying (or controlling) the tinting or transmissivity level of lenses 5. The thin-film layers 20 on opposing sides of the variably optically transmissive layer 25 are preferably electrically isolated and separately electrically coupled to appropriate control circuitry to enable multi-level or continuously variable control of the effective transmissivity of each lens 5, and are capable of being varied from transparent or clear to non-transparent or dark.

In a preferred embodiment, electro-tinting layers 15 of lenses 5 are designed to permit the coupling of viewer-defined multi-voltage level electrical signals through transparent, electrically-conductive ITO thin-film layers 20 to control the crystal alignment of the variably optically transmissive PDLC layer 25 and thus permit the tint level of lenses 5 to be controllably variable from clear to dark across a discrete or continuous range of tinting levels.

Figure 4:
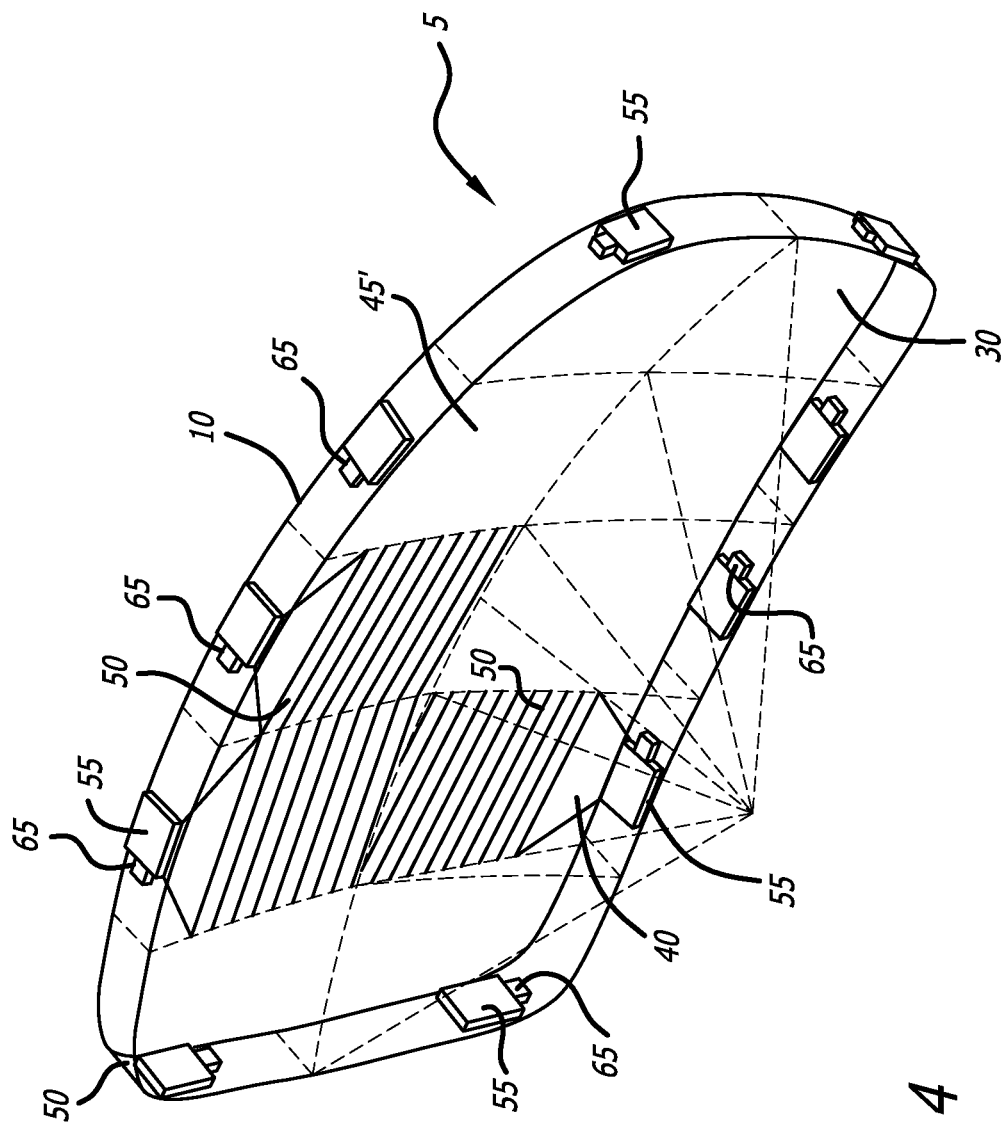
FIG. 4 depicts the lens of the dual-mode augmented/virtual reality near-eye wearable display of the invention and illustrates the optical waveguide structures of the lens.

The back side, viewer facing surfaces 30 of lenses 5 are provided with one or more optical waveguide structures 40 (FIG. 4). In a preferred embodiment, back-side surface 30 may be provided with an optical thin-film layer of a polymer comprised of a plurality of waveguide layers 50 that are disposed within lens thickness 5' each defining a respective exit aperture. The waveguide layers 50 may be provided as a plurality of micro-imprinted facets or equivalent optical structures that are configured to permit light received into the waveguide structures 40 that are located proximal peripheral surface 5" (preferably outside the viewer's eye pupil viewing region) of each of lenses 5 to be totally internally reflected (TIR) or "wave-guided" through a respective portion of lens' thickness 5' to a predetermined exit aperture sub-region 45' defined by the respective waveguide layer 50 which is located within the viewing region of the viewer's eye pupil as is depicted in FIG. 4. (Not all waveguide layers are shown so as to not unnecessarily obscure other aspects of the Figure.). FIG. 4 generally illustrates a plurality of waveguide structures 40 coupled to a plurality of exit aperture sub-regions 45' within the lens 5 viewing area. The waveguide layers 50 generally span the entire respective exit aperture sub-region 45' except for a boundary region adjacent the periphery region of the respective lens 5 so as to enable the creation of a collective image with no gaps or dead regions as a result of the tiling of the individual image portions of each aperture sub-region 45'.

Waveguide structures 40 may be fabricated, for instance, using either surface relief or volume relief diffractive optical structures (DOC) within lens thickness 5' and may be provided as, for example, a diffractive grating, blazed grating, multi-level or Bragg grating or equivalent structure as is known in the optical arts.

Waveguide layers 50 may be designed to diffract broadband light preferably covering the visible light spectrum.

Waveguide layers 50 are preferably designed to optically couple light that is emitted from an image source or sources 55 into each lens 5 and to the viewer's eye pupil region. The waveguide structures together with an appropriate microlens array forming part of the image sources 55 are configured to appropriately optically magnify and redirect the image coupled into each lens sub-region 45'. In particular, the micro-imprinted facets on the reflective prism-like grating elements can be provided with separate, viewer-defined facet angles that are different from one another, e.g. which become progressively larger or smaller, over the waveguide layer 50 itself to redirect the light at the exit aperture defining the respective image portion to converge toward the viewer's eye.

The dual-mode AR/VR near-eye wearable display 1 of the invention may further comprise at least one image source 55 directly optically coupled to a respective waveguide structure 40 of each of lenses 5 whereby each image source 55 is capable of generating and outputting a digital optical image portion comprising a 2D array of multi-color pixels. As stated before, each image source 55 provides an image portion to a respective input aperture 40, to be presented to the respective exit aperture of a respective exit aperture sub-region 45' of the respective lens 5, so that each image portion will fill the respective exit aperture sub-region 45' except for a small portion at the outer edge of the lenses 5, to be able to provide a single combined image in each lens by the tiling of the respective image portions.

Image sources 55 that are optically coupled to lenses 5 may be provided with the ability to modulate either single-view images or multi-view light field images in the dual-mode augmented/virtual reality near-eye wearable display.

The image sources 55 that are optically coupled to lenses 5 are preferably sufficiently compact to be coupled to lenses 5 without obstructing the dual-mode AR/VR wearable display viewer's field of view.

Image sources 55 are provided to enable the requisite compactness of a wearable display by, in a preferred embodiment, being of the emissive type (as opposed to "back-lit" or "transmissive" image sources) and are capable of generating an image that substantially matches the display area and required angle of divergence of input image aperture 40 of lenses 5. Emissive imagers may be optically coupled directly from their emissive surfaces through the micro-lens array of the emissive imagers without the need for bulky optical interface or relay elements that undesirably obstruct a viewer's field of view.

The image sources 55 that are optically coupled to lenses 5 may be provided, for example, from a class of emissive display devices called Quantum Photonic Imagers ("QPI™", a trademark of Ostendo Technologies, Inc.) described in, for instance, U.S. Pat. Nos. 7,623,560; 7,829,902; 8,567,960; 7,767,479; 8,049,231; and 8,243,770, which are the subject of multiple patents and patent applications assigned to Ostendo Technologies, Inc., assignee of the instant application.

Exemplary emissive display elements suitable for use as image sources 55 with the instant invention include, without limitation, light field emissive display devices as taught in, for instance U.S. Pat. Nos. 9,195,053; 8,854,724 and 8,928,969, each entitled "Spatio-temporal Directional Light Modulator" or emissive display elements taught in U.S. Pat. Nos. 7,623,560; 7,829,902; 8,567,960; 7,767,479; 8,049,231; and 8,243,770; each entitled "Quantum Photonic Imagers And Methods Of Fabrication Thereof"; each assigned to Applicant herein and the entire contents of each of which are incorporated herein by reference.

The above-referenced image sources that are the subject of the above-referenced respective U.S. patents desirably feature high brightness, high resolution and very fast response with multi-color light, some with spatial modulation capabilities, in a single emissive display device that includes all necessary display drive circuitry. While the devices disclosed in the above-referenced patents are well-suited for use in the invention, it is expressly contemplated that within the context of this invention, the term image source or image sources as used herein encompasses any optoelectronics device that comprises an array of emissive micro-scale solid state light-(SSL) emitting pixels of a suitable size. The SSL light-emitting pixels of such devices, hereinafter referred to collectively as image sources, may be either a light-emitting diode (LED) or laser diode (LD) structure or any solid state light-emitting (preferably multi-color) structure whose on-off state is controlled by drive circuitry, and alternatively may comprise, as an example, an image source 55 comprising an OLED imager device.

Figure 3C:
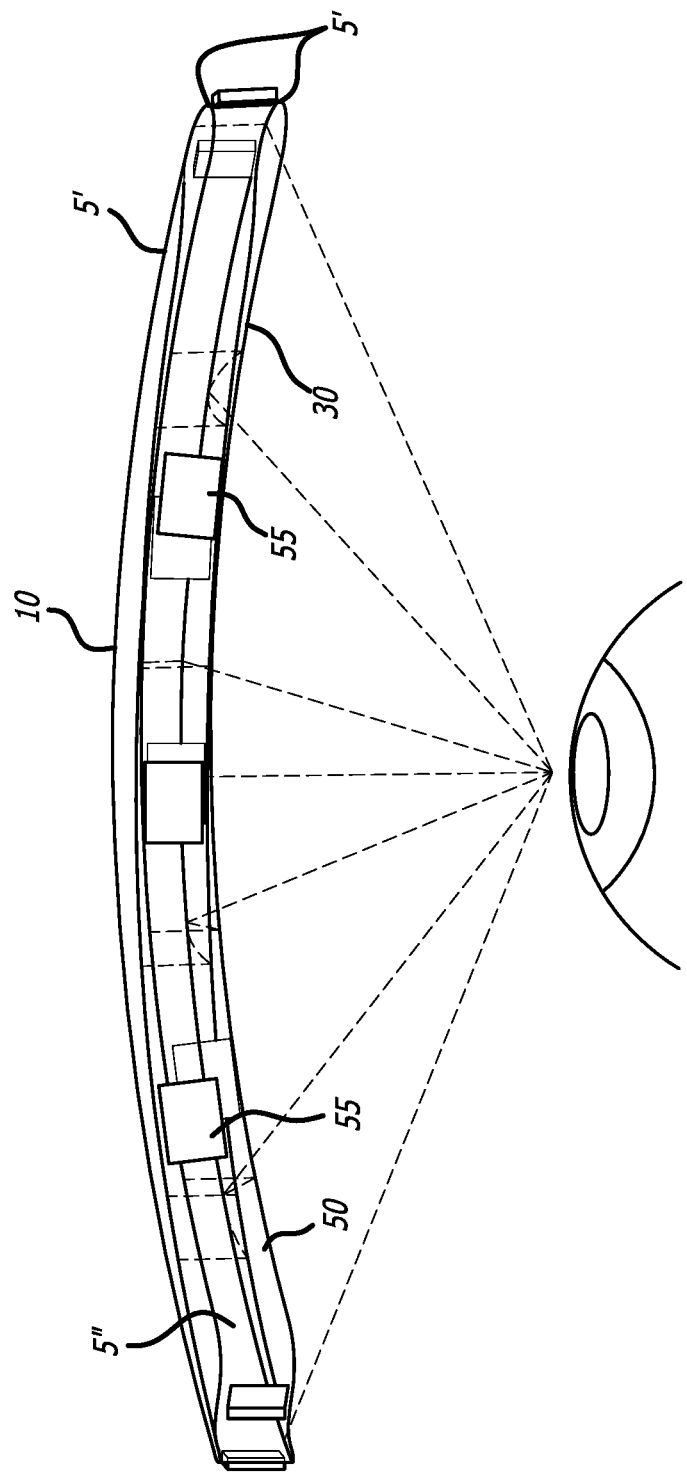
FIG. 3C depicts a top view of the lens element of FIG. 3A.

The pixels within the emissive micro-scale array of the image sources of the above-referenced U.S. patents are beneficially provided as individually addressable, spatially, chromatically and temporally, through associated drive CMOS circuitry, enabling such image sources to emit light that is modulated spatially, chromatically and temporally. The multiple colors emitted by the image sources disclosed in the above-referenced patents desirably share the same pixel aperture. The pixel apertures emit multi-colored and collimated (or non-Lamberitain) light with an angle of divergence ranging from about ±5° to about ±45°. The size of the pixels comprising the emissive array of the image sources of the above-referenced patents are typically in the range of approximately 5-20 microns with a typical emissive surface area of the image sources being in the range of approximately 15-150 square millimeters. The image sources that are the subject of the above patents are provided with a minimal gap or boundary between its emissive pixel array and the physical edge of the device, enabling a multiplicity of image source devices to be "tiled" to create a viewer-defined arbitrary size display area. However when disbursed individually around the periphery of the lenses of the present invention as shown in FIGS. 3A, 3C and 4 and as described above, it is the image portions that are tiled, not the image sources themselves, so that a boundary on the image sources themselves is of no consequence unless somehow the image sources themselves are to be tiled.

The image sources 55 that are optically coupled to the lenses 5 of the invention are capable of generating video images with a brightness that is digitally controllable within a range that extends preferably from 1-15 lumens, preferably at a minimal power consumption so as to enable practical integration within the compact configuration of the disclosed dual-mode AR/VR wearable display 1.

Image source's 55 controllable brightness level enables generating the appropriate brightness level to match multiple operational modes of dual-mode AR/VR wearable display 1.

The image sources 55 that are optically coupled to lenses 5 may be configured to generate an image size and shape (in terms of the number and boundary of the pixels being modulated and coupled into input image aperture 40) that can be digitally controlled whereby the controllable image size and shape are used to couple an image with a variably-controlled size and shape into exit aperture 45 or exit aperture sub-regions 45' of the lenses 5.

The image sources 55 that are optically coupled to the lenses 5 preferably comprise at least one image source 55 dedicated to each lens 5 as described above or a plurality of image sources 55 coupled into multiple waveguide structures of each lens 5 whereby each image source 55 is coupled to a different sub-region 45' as is depicted in FIG. 4.

The use of a plurality of image sources 55 coupled into multiple input image apertures 40 of each lens 5 whereby each image source 55 is effectively coupled to a separate, dedicated exit aperture sub-region 45' permits a waveguide flatness condition (typically required to sustain the TIR waveguiding condition) to be required only across a small portion of lens 5 within lens thickness 5', thus requiring lens 5 to be only "piecewise flat" over the individual exit aperture sub-regions 45'. This in turn, enables the use of overall curved lenses 5 having a non-planar surface and curved cross-sectional profile.

The ability to provide lenses 5 as "piecewise flat" enables the use of curved-shaped lenses rather than substantially planar lenses required when typical waveguide optics are used. The piecewise flat portions of a curved lens allow the use of a more aesthetically-appealing eyeglass lens shape and a streamlined look for the dual-mode AR/VR near-eye wearable display 1 of the invention.

As possible alternatives, depending on the overall design of the dual-mode AR/VR near-eye wearable display 1 it might be possible to directly project the images from the image sources 55 onto the waveguide layer 50. As a further alternative, since total internal reflection merely only requires an angle of incidence of the light to the internal surface to be below a critical angle, and the number of internal reflections will normally not be large, such as in the range of one to three, and the curvature of a lens 5 need not be large to get the aesthetic effect desired, it may be possible to use a continuously curved lens 5 rather than a piecewise flat lens 5. While the image portion displayed to a viewer would be distorted, the image portion could be oppositely pre-distorted, such as by an appropriate micro-lens layer of the image sources 55, and/or corrected electronically to remove that distortion. Also it should be noted that the total internal reflection, if used, is only needed where the internal reflection is used, namely adjacent the edges of each lenses 5. Otherwise the lenses 5 may be gently continuously curved like normal glasses and the waveguide layer 50 changes accordingly, and if desired, the edges of the eyeglass frames could be covered by an overhanging edge portion so only the continuously curved portion would be normally visible.

The use of a plurality of image sources 55 coupled onto multiple input waveguide structures 40 of each lens 5 whereby each image source 55 is coupled to a different and dedicated exit aperture sub-region 45' further allows the waveguide optical path from the plurality of image sources 55 to exit aperture sub-regions 45' to have light rays that converge upon each of the viewer's eye pupils from different directions.

The use of a plurality of image sources 55 coupled into multiple input image apertures 40 with each being coupled to a different exit aperture sub-region 45' and the respective waveguide optical paths from the plurality of respective image sources 55 through the plurality of respective exit aperture sub-regions 45' causes light emitted from different image sources 55 to converge upon each of the viewer's eye pupils from different directions with the image sources 55 associated with each exit aperture sub-region 45' preferably modulating a different perspective view and enabling the dual-mode AR/VR near-eye wearable display 1 to display a multi-view light field scene.

The use of a plurality of multi-view light field image sources 55 coupled into multiple waveguide structures 40 with each being coupled to a different sub-region 45' and the waveguide optical path from the plurality of image sources 55 through respective exit aperture sub-regions 45' causes the multi-view light field emitted from different image sources 55 to converge upon each of the viewer's eye pupils from different directions with the image sources 55 associated with each exit aperture sub-regions 45' modulating a different multi-view perspective. This enables the dual-mode AR/VR near-eye wearable display 1 to modulate a fine (small) angular (pitch) resolution light field over a wide field of view (FOV) whereby the coarse directional modulation (for example 15° angular separation between chief rays within the total FOV) is accomplished by the plurality of image sources' 55 chief ray angles of convergence into the viewer's eyes and the fine directional modulation of the light field (for example 0.5° angular separation between views within the sub-region FOV) is accomplished by an image source 55 modulating a set of different perspectives separated by the fine angular separation pitch within their respective exit aperture sub-region 45' directions.

The use of a plurality of multi-view light field image sources 55 coupled into multiple waveguide structures 40 enables the modulation of a light field that provides a sufficient number of views to each of the viewer's pupils (preferably 8-12views per pupil with at least six views along the horizontal parallax) to the extent that it substantially eliminates the so-called "vergence accommodation conflict" (VAC) effect (which causes severe viewer ) discomfort and which is commonly encountered in prior art near-eye autostereoscopic, displays), thus making the disclosed dual-mode AR/VR near-eye wearable display 1 a VAC-free display.

The use of a plurality of image sources 55 coupled into multiple waveguide structures 40 enables increasing the display resolution (in terms of the number of pixels being displayed to the viewer) by either increasing the number of image sources 55 being optically coupled to each of the display lenses 5, for example and not by way of limitation, using eight image sources 55, each having 125,000, 10-micron pixels to enable one million pixels per eye, or by decreasing the image sources' 55 pixel size, for example and not by way of limitation, using eight image sources 55 of the same physical size as the above example but each having 500,000, five-micron pixels to enable the display of two million pixels per eye.

The use of a plurality of image sources 55 coupled into respective multiple waveguide structures 40 of each lens 5 enables a high pixel resolution per eye modulating a sufficient number of views to each of the viewer's pupils making it possible to modulate digital holographic images or light field images to the viewer.

Image sources 55 having electronically controllable image size and shape may be used to generate the appropriate image size and shape that matches the various operational modes of the dual-mode AR/VR wearable display 1 and optical image distortions.

Turning back to FIG. 2, the dual-mode AR/VR near eye wearable display 1 may comprise at least one eye tracking sensor 65 per eye, the output of eye tracking sensor 65 being configured to detect multiple predetermined parameters of the viewer's eyes including but not limited to the angular position (or look angle) of each eye, the iris diameter, and the distance between the two pupils.

Eye tracking sensors 65 may comprise a plurality of image detection sensors, such as a CMOS detector array device, that are coupled to an input image aperture 40 of each of the lenses 5 whereby each eye tracking sensor 65 is positioned in close proximity to the image source 55 to take advantage of the optical transfer function of the optical waveguide structure 40 of each lens 5. This enables the use of each lens' 5 optical waveguide structure 40 to serve two functions; one being functioning as an optical path from the plurality of image sources 55 to the waveguide layer and from there to each eye, and the second being functioning as a reverse optical path from each eye to the one or more image detection eye tracking sensors 65.

The multiple images captured by the plurality of image detection eye tracking sensors 65 may be blended (or fused) together to form captured images of each pupil and to also form an image of the display exit aperture 45 or exit aperture sub-region 45' to be used to infer the color and brightness uniformity across multiple exit aperture sub-regions 45'.

Eye tracking sensors 65 may be utilized to detect the brightness and color uniformity across multiple display exit aperture sub-regions 45' whereby the images captured by the eye tracking sensor(s) 65 are analyzed to determine the brightness and color of each of the display exit aperture sub-regions 45'. Then the determined values are compared and the brightness and/or color of the plurality of image sources 55 that are coupled into multiple waveguide structures 40 may be adjusted accordingly to cause the color and brightness across the entire set of exit aperture sub-regions 45' to become uniform within a given, viewer-defined threshold, for example 10%.

The eye parameter outputs of eye tracking sensors 65 may be subsequently utilized to adjust the display parameters for each eye by adjusting the parameters of the plurality of multi-view light field image sources 55 that are coupled into multiple input image apertures 40 of each lens 5, for example, adjusting the display resolution to its highest level in the "eye-look" direction within a region of 1° to 2°, or selecting the light field compression reference holographic elements (hogels) at the depth inferred from the detected eye parameters, or adjusting the depth of the synthesized holographic 3D image to match the depth where the eye is focused, or adjusting the brightness or color within the eye-look direction of region of 1° to 2°, for example, blurring, reducing and/or adjusting the perspective, resolution, brightness and/or color within the image region outside the eye-look direction of region of 1° to 2°.

Figure 2:
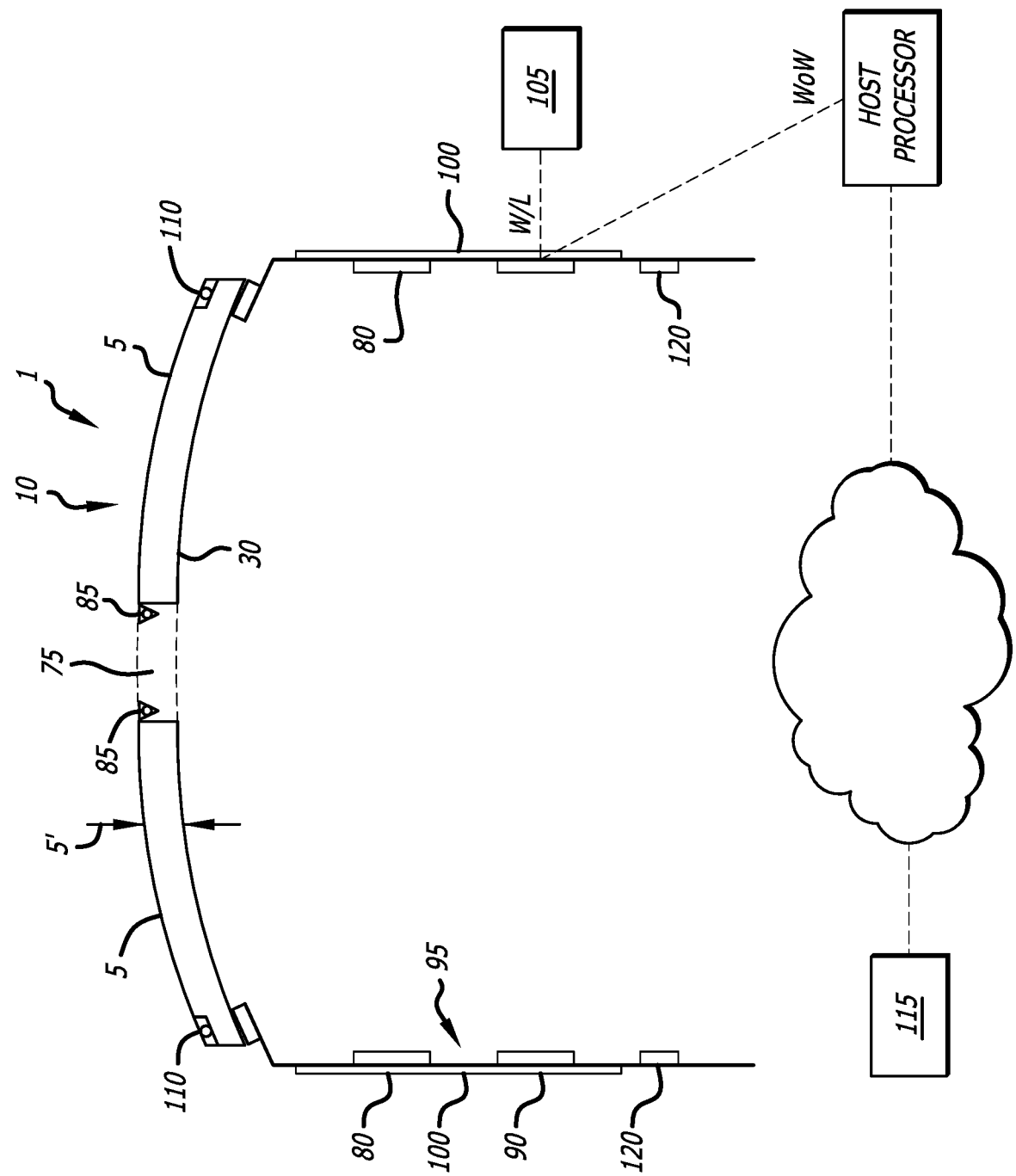
FIG. 2 depicts a top plan view of the dual-mode augmented/virtual reality near-eye wearable display of the invention.

The image sources 55 and one or more eye tracking sensors 65 configured to perform an image uniformity function that are optically coupled to the lenses 5, may be electrically coupled to an interface control and processing element (ICPE) configured as a compact printed circuit, preferably integrated within the glasses' frame temple 75 assembly of the dual-mode AR/VR wearable display 1 such as is illustrated in FIGS. 1 and 2 or in a temple of the glasses. The ICPE normally would operate under program control.

The electrical coupling from the dual-mode AR/VR wearable display interface, control and processing element (ICPE) to the image sources 55 may incorporate, for instance, digital video image input signals, brightness control and image size and shape control signals.

The interface, control and processing element (ICPE) of the dual-mode AR/VR wearable display 1 may further comprise both a wireless and wired interface in the glasses' frame temple assembly 75 and connectivity capabilities that enable the dual-mode AR/VR wearable display 1 to interface and be connected either wirelessly or by wire to an image storage source or a control host processor and/or server such as is seen in FIG. 2.

The image processing capabilities required for the processing feedback input from eye tracking sensors 65, may be implemented within the interface, control and processing element (ICPE) of the dual-mode AR/VR wearable display 1.

The interface, control and processing element (ICPE) of the dual-mode AR/VR wearable display 1 may further comprise the capability of synchronizing the images being displayed to both eyes, both in the perspective as well as the temporal aspects.

The interface, control and processing element (ICPE) of the dual-mode AR/VR wearable display 1 may further comprise tilt and orientation sensors 80 preferably implemented using micro-scale gyros and accelerometers to enable sensing of the dual-mode AR/VR wearable display 1 tilt and orientation (head tracking capabilities) as depicted in FIG. 2.

The interface, control and processing element (ICPE) of the dual-mode AR/VR wearable display 1 may further comprise one or more ambient light sensors 85 to enable sensing the brightness of the ambient light environment of the dual-mode AR/VR wearable display.

The interface, control and processing element (ICPE) of the dual-mode AR/VR wearable display 1 may further comprise the interface capability to output the sensed ambient light, tilt and orientation of the dual-mode AR/VR wearable display 1 (ambient light, tilt and orientation sensors output data) to the connected image source 55 and a control host processor and/or server.

The interface, control and processing element (ICPE) of the dual-mode AR/VR wearable display 1 may further comprise a power converter circuit and power management circuitry 90 that is used to convert, regulate and manage the input power provided to the dual-mode AR/VR wearable display 1.

The interface, control and processing element (ICPE) of the dual-mode AR/VR wearable display 1 may further comprise a battery pack as part of the power management circuitry that is coupled to power converter and power management circuits to enable an autonomous (or not-plugged) operational mode.

The interface, control and processing element (ICPE) of the dual-mode AR/VR wearable display 1 may further comprise an input power interface that is coupled to power converter and power management circuitry 90 to enable a plugged operational mode.

Figure 5:
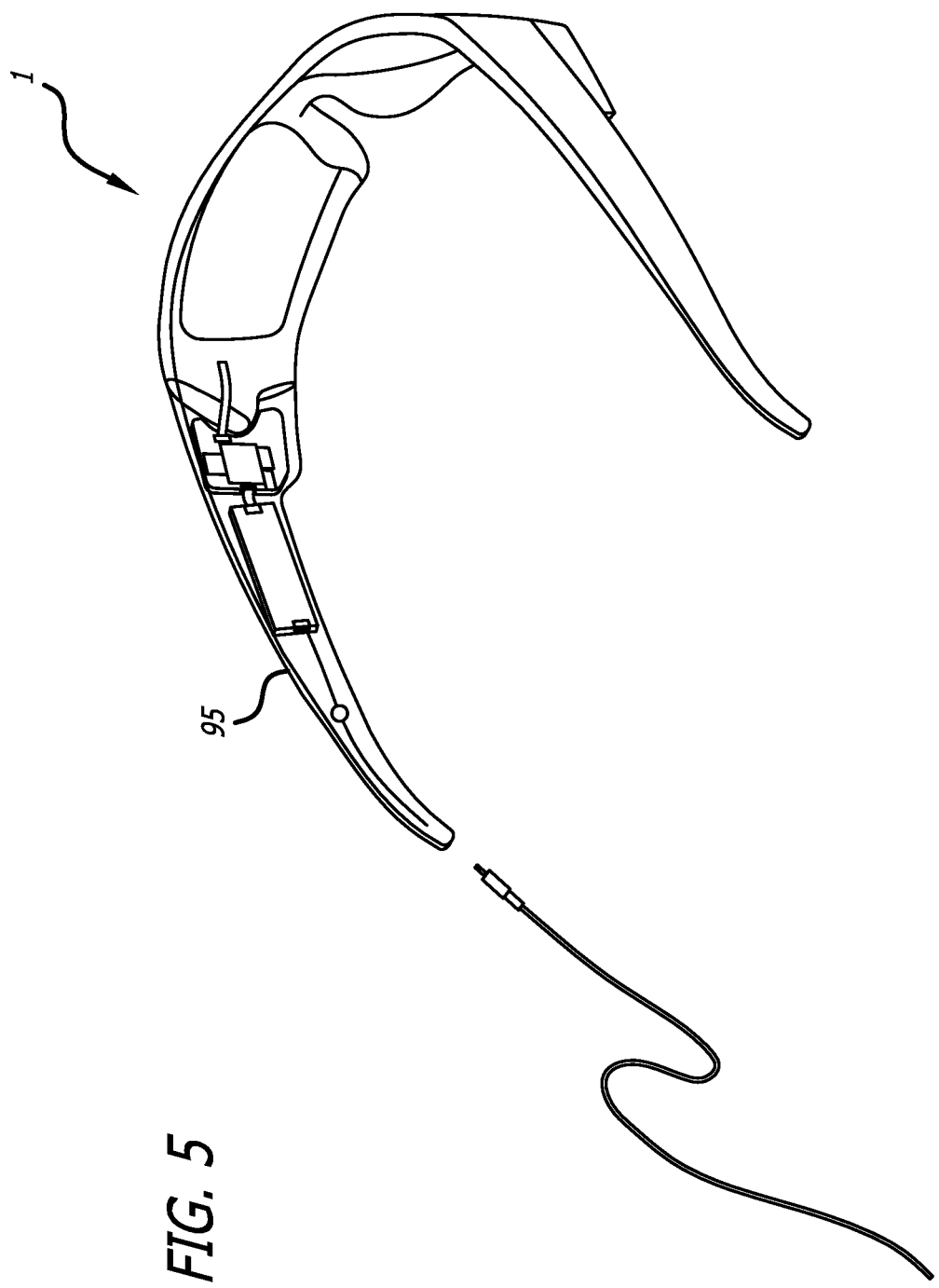
FIG. 5 depicts a perspective view of the dual-mode augmented/virtual reality near-eye wearable display of the invention showing the battery and connector of the temple of the display frame.

The interface, control and processing element (ICPE) of the dual-mode AR/VR wearable display 1 may further comprise a compact input connector to enable power, data and control interfaces to the dual-mode AR/VR wearable display that are preferably located at the terminal portion of at least one of the wearable display frame's temple assemblies 95 of the dual-mode AR/VR wearable display 1 as depicted in FIG. 5.

Making use of its curved lens 5 and optical waveguide structure 40 feature, the dual-mode AR/VR wearable display assembly 1 may be curved to match the viewer's (viewer) frontal head profile with the temple assembly 75 and lens frame being extended in the vertical axis to sufficiently minimize leakage of excessive ambient light within the viewing region of the dual-mode AR/VR wearable display 1.

The dual-mode AR/VR wearable display 1 may be configured to operate in either a virtual reality VR mode, an augmented reality AR mode or a hybrid AR/VR mode as commanded by either the display viewer (by either touching the display temple or by voice command) or by a command embedded within the interface, control and processing element data input from the image source host processor and/or server.

In the VR mode, the tinting of lenses 5 of the dual-mode AR/VR wearable display 1 may be increased to a maximum (or the transmissivity reduced to a minimum) by appropriately setting the level of the electrical signal coupled into the electro-tinting layers 15 of lenses 5, thus reducing the lens image sources' 55 output image brightness to match the VR brightness level set forth as a preference by the display viewer.

In the VR mode, the dual-mode AR/VR wearable display 1 may provide the sensed tilt and orientation data to the image source for the latter to provide the dual-mode AR/VR wearable display 1 with the appropriately generated VR images depending on the viewer head tilt and orientation. Particularly in the AR mode, tilting or changing the position of the viewer's head will tilt or change the apparent position of the augmented images and not the real images, if not electronically corrected responsive to the tilt and orientation data.

In the VR mode of the dual-mode AR/VR wearable display 1, the lens tinting may be reduced to the minimum level defined by the display viewer when the viewer commands the display to do so (by either touching a touch sensor located on the outside surface of the display arm, the display temple or by voice command) or when the sensed tilt and orientation data indicates the viewer's head as being outside a default viewing volume (or box) set forth by the viewer as a preference. This enables the display viewer to safely move about while still wearing the dual-mode AR/VR wearable display 1 by setting a certain physical viewing box outside of which the display lens tinting is reduced to allow the display viewer to move about safely.

In the VR mode, the dual-mode AR/VR wearable display 1 may be reconfigurable to display either 2D or 3D light field images whereby the tilt and orientation data sensed by the display is used by the image source device to expand the displayable field of view, in both the 2D and 3D modes of operations, or enables a full-parallax 3D viewing experience in the 3D mode of operation.

In the AR mode, the tinting of lenses 5 of the dual-mode AR/VR wearable display 1 may be reduced to a desired viewing level that matches the ambient light level sensed by the display by appropriately setting the level of the electrical signal coupled into tinting layers 15 of the lenses using an ambient light sensor 85. The displayed image's brightness may be increased by reducing the lens image sources' 55 output image brightness to match the sensed ambient light level and the brightness level set forth as a preference by the display viewer.

In the AR mode, the dual-mode AR/VR wearable display 1 may provide tilt and orientation data to the image sources 55 through the ICPE for the latter to provide the dual-mode AR/VR wearable display 1 with the appropriately-generated AR images depending on the viewer head tilt and orientation. Since in the AR mode, both the image visible through the lenses 5 (the real world) and the augmented image, computer generated or otherwise, are visible to a viewer in a coordinated, overlaid manner, if not compensated, the tilt and orientation of the viewer's head would disturb the relative positions of the two images. In a preferred embodiment, the image displayed at any one time can be considered part of a larger augmented image such as may be stored in memory or that can be generated on demand as needed (or both), and that in effect, head movement is effectively corrected by merely moving or twisting the viewable area around that larger image in a compensating manner. Consequently while the physical size of any one image portion displayed in any sub-region 45' won't change, the part of the larger image that is displayed and how it is displayed in any one sub-region 45' is changed by the ICPE with head movement to maintain the alignment of the real and augmented images. This feature may also be valuable in the VR mode also fix the spatial position of the viewable image to add to the viewer's VR experience.

Note that in either the AR or VR mode, typically the image displayed in any sub-region of a lens 5 by an image source will have one or more image source pixels that are not used (black or off) around the edges. This allows the electronic accurate sizing, location and angular position of the image displayed in the sub-region in pixel increments to avoid unreasonable mechanical alignment requirements, etc.

In the AR mode of the dual-mode AR/VR wearable display 1, the lens tinting may be increased to the level set by the display viewer when the viewer commands the display to do so by either touching a touch sensor 100 located on the outside surface of the display temple or by voice command, or when the sensed ambient light data indicates the ambient light has increased to a point that would reduce contrast of the displayed image.

In the AR mode, the dual-mode AR/VR wearable display 1 can display either 2D or 3D light field images whereby the tilt and orientation data sensed by the display may be used by the image source 55 to expand the displayable field of view, in both the 2D and 3D modes of operations, or enable full-parallax 3D viewing experience in the 3D mode of operation.

In the hybrid AR/VR mode of the dual-mode AR/VR wearable display 1, the operational mode may be controlled by the display content which contains embedded mode control command data packets that, depending on the content of the scene being displayed and/or where the viewer's eye is directed and focused, causes the dual-mode AR/VR wearable display 1 to emphasize certain objects or focal planes within the displayed image by modifying the tinting levels and/or the contrast level of such scene objects or focal depth.

The dual-mode AR/VR wearable display 1 may comprise both touch and voice control capabilities that are used, as explained above, to switch between the AR and VR modes of operation and to control various operational parameters of each mode.

The touch control capabilities may be implemented as a touch sensor 100 integrated on the temple assembly outside casing (or enclosure). Touch sensor 100 may be designed to respond to single touch, multiple touches or touch and drag type of commands. In both the AR and VR modes, the default setting of the exemplary right side touch sensor 100 is a drag to control touch sensor to control the display lens tinting level and on the left side touch sensor 100 is a drag to control touch sensor to control the display brightness level. In the VR mode, a single touch to either side may change the display lenses' tinting to allow the display viewer to safely move about. Multiple touches may be used to change the default control of the touch sensor based on a programmable menu that allows the display viewer to set and change each operational mode parameter to match their needs.

Voice control capabilities may be provided to enable the display viewer to control the display mode such as AR versus VR or hybrid AR/VR and the display operational parameters such as brightness or image size.

Through its wireless or wired interface capabilities in the glasses' frame temple 75 assembly, the dual-mode AR/VR wearable display 1 enables an interface with a hand gesture sensor 105 that allows the display viewer to control the display mode such as AR versus VR or hybrid AR/VR and the display operational parameters such as brightness or image size and to also control and/or select the display contents using soft buttons or icons that may be added or removed from the viewer display area by either hand, voice or touch gestures.

The dual-mode AR/VR wearable display 1 may further comprise at least one "reality" sensor 110 (preferably a light field camera) that preferably captures ambient light field content and couples the captured images to the interface, control and processing element (ICPE) which then blends or fuses the images being displayed to fit and optically match the reality perspective being viewed in the AR mode or to integrate the images captured by the reality sensors into the displayed content in the VR mode.

The dual-mode AR/VR wearable display 1 may further comprise the capabilities to accept input image data or video data in a compressed format (such as MPEG or JPEG for example) and either first decompress the input images, then display them to the viewer, or directly display them to the viewer using Visual Decompression techniques as discussed below to reduce the decompression processing and memory requirements and reduce power consumption.

The plurality of image sources 55 of the dual-mode AR/VR wearable display 1 may further comprise Visual Decompression capabilities to modulate images using high order bases of (n×n) pixels (instead of the standard 1 pixel modulation bases) then modulating the coefficient of a commensurate discrete wavelet, (DWT) transform or a discrete cosine transform (DCT) representation of the image (which are typically the coefficients used by MPEG and JPEG compression techniques), thus enabling the dual-mode AR/VR wearable display 1 to modulate images using the compressed image data directly. This, in turn, results in efficiencies in data processing throughput and memory usage and consequently reducing the volumetric and power consumption requirement of the interface, control and processing element (ICPE) of the dual-mode AR/VR wearable display 1.

The dual-mode AR/VR wearable display 1 may further comprise capabilities to accept input images or videos compressed using light field compression techniques and formats and applying compressed light field rendering in order to decompress and synthesize the light field to be displayed from a set of compressed reference holographic elements (hogels) in order to reduce image interface bandwidth, decompression processing and memory requirements and to reduce power consumption.

The dual-mode AR/VR wearable display 1 may further comprise the capability of interfacing with a cloud server 115 and to query that server to download a selected set of compressed light field holographic elements (hogels) based on the detected viewer's eyes and head position and orientation, then to accept from the server a set of requested light field holographic elements (hogels), then applying compressed light field rendering in order to decompress and synthesize the light field to be displayed from a set of compressed reference holographic elements (hogels). This beneficially further reduces image interface bandwidth, as well as decompression processing and memory requirements and power consumption.

The dual-mode AR/VR wearable display 1 may further comprise capabilities to interface with a cloud server 115 and query the server to download a selected set of compressed light field holographic elements (hogels), herein referred to as reference hogels, based on the detected viewer's eyes focus depth or distance, then to accept from that server a set of requested reference light field hogels, then applying compressed light field rendering in order to decompress and synthesize the light field to be displayed from a set of compressed reference hogels in order to further reduce the image interface bandwidth, as well as decompression processing and memory requirements and reduce power consumption.

The dual-mode AR/VR wearable display 1 may further comprise capabilities to interface with a cloud server 115 configured as a Networked Light Field Photography cloud server, then interact with the server to upload the ambient light field images being captured by its reality sensors 110 and download the images of the viewer-extended light field to allow the viewer to view the contents of its ambient light field beyond its visual reach, i.e., extended light field, or in order to allow the display viewer to browse through a downloaded light field using either the VR or AR modes of the display.

The dual-mode AR/VR wearable display 1 may further comprise capabilities to interface and query a cloud server 115 to download video content of a selected portion of a video data set depending on the eye parameters (look angle and depth of focus, for example) detected by one or more eye tracking sensors 65.

The dual-mode AR/VR wearable display 1 may further comprise capabilities to interface with an audio interface 120 which may comprise an audio speaker and a microphone both integrated within the volumetric perimeters of temple assembly 75 whereby the microphone is electrically coupled to the interface, control and processing element (ICPE) and is used to interface the viewer voice commands to the voice recognition processing element (software) of the interface, control and processing element (ICPE) and the speaker electrically coupled to interface, control and processing element (ICPE) and used for audio content interface to the viewer.

The plurality of image sources 55 and eye tracking sensors 65, reality sensors 110 and the interface, control and processing element (ICPE) may be embossed within the volumetric perimeters of the rims of the lens bezel and the temples of the near-eye wearable display glasses frame, respectively, to create a streamlined-looking near-eye wearable display glasses that are aesthetically and cosmetically appealing when worn in public, such as is illustrated in FIG. 1.

The dual-mode AR/VR wearable display 1 may be expected to display reference images of objects, icons and/or markers from time to time, and a processing element of the device may further comprise capabilities to keep track in its interface, control and processing element memory of the subset of reference images of objects, icons and/or marker that frequently appear within the displayed content then subsequently abbreviate the fine details or lower the resolution of this subset of reference images in order to reduce processing and memory requirements and reduce power consumption. This feature leverages the cognitive perception capabilities of the human visual system (HVS) by virtually filling in the details required to recognize and/or identify familiar or previously visually-sensed objects and images in order to maximize the efficiency, in terms of response latency, processing throughput and memory requirement and power consumption of the dual-mode AR/VR near-eye wearable display 1.

The dual-mode AR/VR wearable display 1 may further comprise capabilities to analyze the content to be displayed on the device on a frame-by-frame basis to deduce the color gamut size, in terms of the coordinates of the gamut color primaries, then command the plurality of image sources 55 to synthesize the deduced color gamut using the measured gamut color primaries in the modulation of the images being displayed to the viewer. This feature leverages the fact that the color gamut of image content from frame-to-frame is typically much smaller than the full color gamut that can be synthesized by laser diode or LED based image sources 55 referred to above in order to maximize efficiency in terms of brightness, color content, processing throughput and memory requirement and power consumption of the dual-mode AR/VR near-eye wearable display 1.

Referred to herein are an ICPE and a host processor shown in FIG. 2, both of which would include one or more processing elements, which in turn would include memory as required. It should be understood that any processing may be done on or off the device of FIG. 1, or both, using wireless or wired communication, and references to a processing element in the claims to follow are to be understood to refer to one or more processing elements on and/or off the device of FIG. 1.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by any claims in any subsequent application claiming priority to this application.

For example, notwithstanding the fact that the elements of such a claim may be set forth in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus, if an element can be understood in the context of this specification as including more than one meaning, then its use in a subsequent claim must be understood as being generic to all possible meanings supported by the specification and by the word itself.

The definitions of the words or elements of any claims in any subsequent application claiming priority to this application should be, therefore, defined to include not only the combination of elements which are literally set forth, but all equivalent structure, material or acts for performing substantially the same function in substantially the same way to obtain substantially the same result. In this sense, it is therefore contemplated that an equivalent substitution of two or more elements may be made for any one of the elements in such claims below or that a single element may be substituted for two or more elements in such a claim.

Although elements may be described above as acting in certain combinations and even subsequently claimed as such, it is to be expressly understood that one or more elements from a claimed combination can in some cases be excised from the combination and that such claimed combination may be directed to a subcombination or variation of a subcombination.

Insubstantial changes from any subsequently claimed subject matter as viewed by a person with ordinary skill in the art, now known or later devised, are expressly contemplated as being equivalently within the scope of such claims. Therefore, obvious substitutions now or later known to one with ordinary skill in the art are defined to be within the scope of the defined elements.

Any claims in any subsequent application claiming priority to this application are thus to be understood to include what is specifically illustrated and described above, what is conceptually equivalent, what can be obviously substituted and also what essentially incorporates the essential idea of the invention.

What is claimed is:

1. A near-eye display device, comprising:
   a first optical lens comprising:
   a scene-facing surface;
   a viewer facing surface comprising a viewer's eye pupil viewable region;
   a plurality of optical waveguide structures located on the viewer facing surface, comprising a respective plurality of waveguide layers that define a plurality of respective sub-regions of the viewable region;
   an edge surface between the scene-facing surface and the viewer facing surface;
   a plurality of emissive type image sources disposed on the edge surface, each emissive type image source coupled to a respective optical waveguide structure and generating a respective portion of a viewable image;
   wherein each respective waveguide structure receives the generated respective portion of the viewable image and relays it through the respective waveguide layer where it is displayed in the respective sub-region of the viewable region of the viewer facing surface; and
   a second optical lens, wherein the first optical lens and the second optical lens are fastened in a frame, including temple assemblies.

2. The near-eye display device of claim 1 wherein each emissive type image source comprises a plurality of pixels each of which is addressable spatially, chromatically and temporally.

3. The near-eye display device of claim 2 wherein the plurality of waveguide layers permit light received into the plurality of waveguide structures to be totally internally reflected (TIR) through the first optical lens to a respective sub-region of the viewable region.

4. The near-eye display device of claim 2 wherein the viewable image is part of a larger image stored in a memory or generated on demand as needed, or both, and further comprising:
   a plurality of head movement sensors for sensing movement of a head of a viewer wearing the near-eye display device; and
   a processing element responsive to the head movement sensors to control the part of the larger image that is viewable through a respective waveguide layer and how it is displayed with head movement to maintain alignment of real and augmented images in an augmented reality mode, or to fix a spatial position of the viewable image from the plurality of emissive image type sources in a virtual reality mode.

5. The near-eye display device of claim 2 further comprising an image detection sensor associated with a respective emissive image type source in optical communication with a viewer's eyes to track a parameter of the viewer's eye or eyes.

6. The near-eye display device of claim 1 wherein the scene-facing surface of the first optical lens comprises an electro-tinting layer having an electronically variably optically transmissive layer disposed between a first and a second electrically conductive transparent thin film layer.

7. The near-eye display device of claim 6 wherein the variably optically transmissive layer comprises a polymer dispersed liquid crystal material.

8. The near-eye display device of claim 6 wherein at least one of the first and second electrically conductive transparent thin film layers comprises an indium tin oxide material.

9. The near-eye display device of claim 6 further comprising at least one ambient light sensor, and a processing element responsive to the ambient light sensor for controlling the emissive type image sources and the electro-tinting layer to control a relative brightness between the emissive type image sources and real images viewable through the electro-tinting layer.

10. The near-eye display device of claim 6 further comprising an audio interface including a microphone and a speaker for audio communication with the near-eye display device.

11. The near-eye display device of claim 6 further comprising a touch sensor for controlling a mode of operation of the near-eye display device or the electro-tinting layer.

12. The near-eye display device of claim 11 wherein the touch sensor includes a touch and drag sensor.

13. The near-eye display device of claim 1 wherein the plurality of waveguide layers comprise micro-imprinted facet structures.

14. The near-eye display device of claim 13 wherein the micro-imprinted facet structure comprises a surface relief optical element.

15. The near-eye display device of claim 1 wherein the waveguide layer comprises a volume relief diffractive optical element.

16. The near-eye display device of claim 1 wherein the waveguide layer comprises a diffractive grating.

17. The near-eye display device of claim 1 wherein the waveguide layer comprises a blazed grating.

18. The near-eye display device of claim 1 wherein the waveguide layer comprises a multi-level grating.

19. The near-eye display device of claim 1 wherein the waveguide layer comprises a Bragg grating.

20. The near-eye display device of claim 1 wherein the near-eye display device has a curved appearance.

21. The near-eye display device of claim 1 further comprising a wired or wireless communication link to a host processor and/or server.

22. The near-eye display device of claim 1 further comprising:
a processing element; and
wherein the processing element to track in a processing element memory reference images of one or more of objects, icons and markers, or portions thereof that appear within the viewable image.

23. The near-eye display device of claim 1 further comprising:
a processing element; and
wherein the processing element to analyze a content of a scene to be displayed on the near-eye display device on a frame-by-frame basis to deduce a color gamut size, in terms of coordinates of a plurality of gamut color primaries, then command the plurality of emissive type image sources to synthesize the deduced color gamut size using the plurality of gamut color primaries in a modulation of the viewable images being displayed.

24. The near-eye display device of claim 1 further comprising:
a processing element configured to sense when a viewer recognizes a displayed viewable image and to modify the recognized displayed viewable image.

* * * * *